Patented Aug. 28, 1934

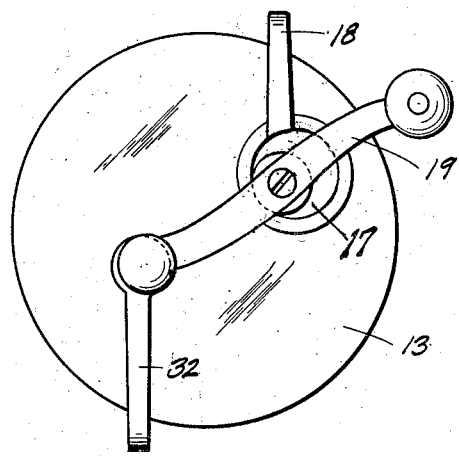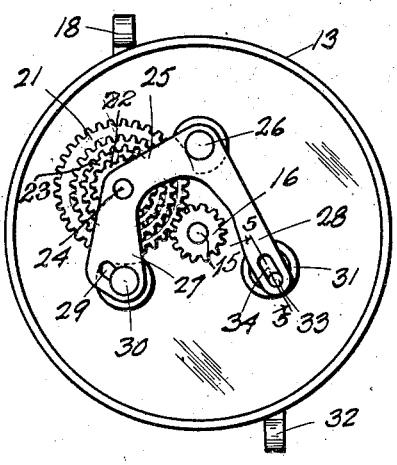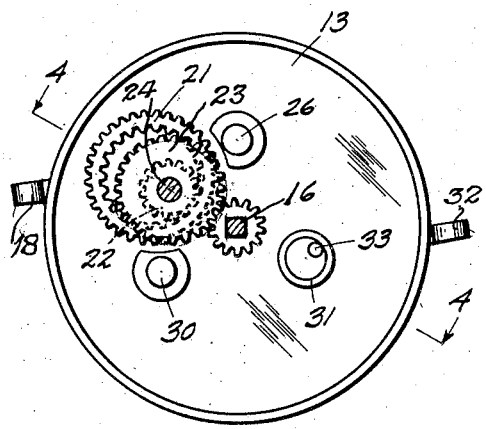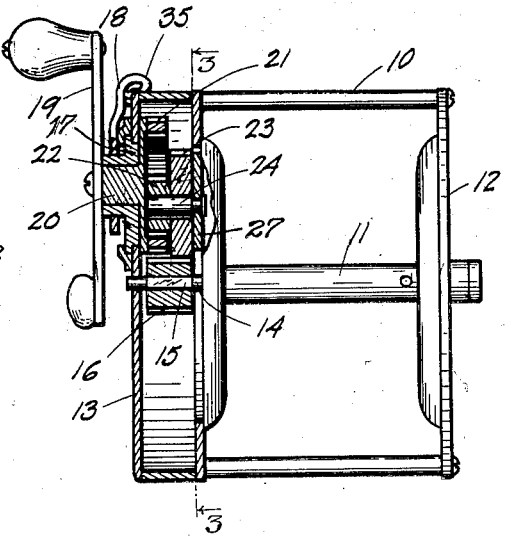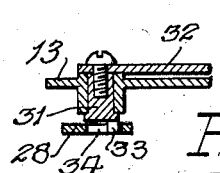

1,971,724

UNITED STATES PATENT OFFICE 1,971,724

FISHING REEL

Harry J. Mathieu, Oakland, Calif.

Application July 19, 1932, Serial No. 623,403

12 Claims. (Cl. 242—84.7)

This invention is a compound gearing for fishing reels and is specially adapted to provide different ratios between the reel and the crank whereby the speed of the line takeup may be varied.

The main object of the invention is to provide compound gearing for a fishing reel whereby two different speeds are obtained relative to the speed of the crank handle and which gearing is also disengageable to permit the reel to run free.

Another object of the invention is to provide a compound gearing as outlined with only two lever controls and which are conveniently adjusted adjacent the operating crank.

Other objects and advantages of the invention will become apparent as the following description is read on the drawing forming a part of the specification and in which similar reference characters are used to designate similar parts throughout the several views, of which:

Fig. 1 is an end elevation of a fishing reel with my invention applied thereto.

Fig. 2 is an inside view of the end cap showing my gearing arrangement mounted therein.

Fig. 3 is a section taken on line 3—3 of Fig. 4.

Fig. 4 is a section taken on line 4—4 of Fig. 3.

Fig. 5 is a section taken on line 5—5 of Fig. 2.

The fishing reel may be of any of the standard makes having a frame 10 and a reel 11, the reel being rotatably mounted in the end plate 12 and the cap 13 and having a shaft extension 14 which is provided with a squared end 15 on which is slidably and non-rotatably mounted a pinion 16 by which the reel is adapted to be driven.

Rotatably mounted in the cap, in spaced relation to the pinion shaft 15 is an eccentric 17 having a handle or lever 18 fixedly secured thereto.

Eccentrically and rotatably mounted in the eccentric 17 is a crank or operating handle 19, on the shaft 20 of which an external-internal gear 21 is fixedly secured, so as to be rotated by the crank handle 19. The external gear teeth on the gear 21 are in intermeshing relation to the pinion 16 while the internal teeth are in intermeshing relation with a pinion 22, which pinion is integral with, or fixedly secured to an external gear 23 which is in intermeshing relation to the pinion 16, the pinion 22 and gear 23 being rotatably mounted on a stud 24, which stud is secured in the bracket 25.

The bracket 25 is pivoted on a stud 26, which is fixedly secured in the cap 13, this bracket having two arms 27 and 28, the arm 27 having a slot 29 coperating with a stud 30 to permit an oscillating motion of the arm 27, stud 30 being fixedly secured in the cap 13 and acting as a spacer element for the bracket as related to the cap 13.

Rotatably mounted in the cap 13 is another eccentric 31, on the outer end of which a second adjusting lever 32 is fixedly secured, the inner end having a stud 33 which cooperates with a slot 34 in the arm 28, the eccentric 31 with the eccentrically mounted stud 33 permitting oscillating motion of the lever arm 28 and coincidently therewith, the arm 27 and gear 23 and pinion 22.

The operation of the device is as follows:

By turning lever 18 clockwise until the inturned end 35 engages the periphery of the cap 13 moving the gear 21 to the left as viewed in Figure 3, and also turning lever 32 counter-clockwise until the inturned end of the handle engages the periphery of the cap, the reel is permitted to run free as both gears 21 and 23 are then out of mesh with the pinion 16, this movement swinging the lever 25 with gear 23 about the pivot 26 in a clockwise direction as viewed in Fig. 2. By moving lever 18 to the other position, which is approximately that shown in Fig. 1, the gear 21 is moved into mesh with the pinion 16, and as there is no movement of the lever 25, therefore the gear 23 is retained out of mesh with pinion 16 and as the gear 21 has been moved relative to the pinion 22, the gear 21 is coincidently moved out of mesh with the pinion 22, therefore only the gear 21 cooperates with the pinion 16 and thereby the reel is positively driven at a pre-determined speed by, and relative to the rotation of the crank 19, the arrangement being shown in Fig. 2.

By next moving lever 32 clockwise to the limit of its movement as viewed in Fig. 1, a drag is produced on the reel, both gears 21 and 23 cooperating with the pinion 16 and having different pitch line speeds and the ratio between the two being just sufficient to cause a binding action between the pinion teeth and opposite sides of the teeth of the gears 21 and 23, this means being provided to restrain the unreeling of the line from the reel 11.

By moving lever 18 to its extreme position in the clockwise direction, and lever 32 to its extreme position also in a clockwise direction, a higher ratio is obtained as the gear 21 is then moved out of engagement with the pinion 16 and coincidently moving the internal gear teeth of the gear 21 into cooperation with the pinion 22, the arrangement being that shown in Figs. 3 and 4, the reel 11 then being driven by the internal gear teeth of gear 21 in cooperation with pinion 22 which increases the ratio through the gear 23 to the pinion 16 and a higher reeling in ratio is provided thereby between the reel 11 and the handle or crank 19.

By this means it will be apparent that the reel may be operated at two different speeds, may also be permitted to run freely and may be provided with a drag according to the requirements while fishing.

Having described an operative device it will be understood that variations in construction and arrangement of parts which are consistent with the appended claims may be resorted to without detracting from the spirit or scope of the invention or sacrificing any of the advantages thereof.

I claim:

1. Compound gearing for a fishing reel comprising a crank driven external-internal gear, an external gear having a pinion concentrically secured thereto said pinion being in cooperative relation to the internal teeth of said external-internal gear, a drive pinion non-rotatably mounted on said reel, means whereby said external gear or the external teeth of said external-internal gear may be selectively or simultaneously intermeshed with said drive pinion and relative intermeshing of the internal teeth of said external-internal gear with said pinion is effected.

2. In combination with a fishing reel, a train of gears comprising a driven pinion mounted on said reel, an external-internal gear mounted for rotation by means of an external crank, a pinion in cooperative relation to the internal teeth of said external-internal gear, an external gear concentrically secured to said pinion, and means for moving said external-internal gear, said pinion and said external gear relative to each other, whereby said pinion may be caused to intermesh with the internal teeth of said external-internal gear, relative movement of said external gear or said external-internal gear effecting the engagement of said external gear and the external teeth of said external-internal gear with said driven pinion.

3. Compound gearing for a fishing reel comprising a driven pinion, an external-internal gear, an operating crank integral therewith, a rotatably mounted eccentric, said external-internal gear being rotatably mounted therein, adjusting means for said eccentric, a bracket mounted for oscillatory movement and adjusting means for said bracket, an external gear rotatably mounted on said bracket, a pinion concentrically secured to said external gear said pinion being in cooperative relation to the internal gear teeth of said external-internal gear whereby the adjusting means for adjusting said eccentric and said bracket adjusts said pinion into engagement with the internal teeth of said external-internal gear as the external gear is engaged with, and the external teeth of said external-internal gear are disengaged from said driven pinion.

4. In combination with a fishing reel, a driven pinion, an external-internal gear mounted for engagement with said driven pinion, means for rotating said external-internal gear, means for adjusting said external-internal gear in and out of engagement with said pinion, a second pinion mounted in cooperative relation to the internal teeth of said external-internal gear, an external gear concentrically secured to said second pinion, and means for moving said external gear into and out of engagement with said driven pinion and for moving said second pinion into and out of engagement with the internal teeth of said external-internal gear.

5. In combination with a fishing reel, a reel cap, an eccentric rotatably mounted in said reel cap, means for adjusting said eccentric, a shaft rotatably mounted in said eccentric, a crank secured to one end of said shaft, an external-internal gear secured to the other end of said shaft, a bracket intermediately pivotally mounted within said cap, an external gear having a projecting concentric pinion mounted thereon, said gear and pinion being pivotally mounted on said bracket, means for adjusting said bracket, and a driven pinion rotatably mounted in cooperative relation to said external gear and external teeth of said external-internal gear and means for adjusting said bracket for adjusting said external gear relative to said driven pinion.

6. In combination with a fishing reel, a driven pinion, two gears of different diameters adapted to engage with said driven pinion, means for selectively or simultaneously engaging either or both of said gears with said pinion, means for driving one of said gears at a predetermined speed and means whereby said gear may be caused to drive the other of said gears at a different speed.

7. Compound gearing for a fishing reel comprising a driven pinion mounted on said reel, two gears of different diameters adapted to selectively or simultaneously engage with said pinion and adjusting means for adjusting either of said gears into or out of engagement with said pinion, one of said gears being provided with internal gear teeth, the other of said gears being provided with a projecting pinion adapted to engage with said internal gear teeth.

8. Change speed gearing for a fishing reel comprising; a driven pinion mounted on said fishing reel, two gears of different diameters mounted in cooperative relation to said pinion, means for selectively or simultaneously causing engagement between either or both of said gears and said driven pinion, means for driving one of said gears at a predetermined speed, and means cooperating between the said two gears whereby the said one of said gears may drive the other of said gears at a different speed, and means whereby both of said gears may be disengaged from said pinion for permitting idle movement of the pinion.

9. In combination with a fishing reel, a driven pinion, two gears of different diameters, means for driving said gears and independent adjusting means for each gear whereby selective or simultaneous movement of said gears into or out of engagement with said pinion is effected, simultaneous engagement of said gears with said pinion causing a drag on said pinion, selective engagement of said gears with said pinion driving said pinion at different speeds, and simultaneous disengagement of said gears from said pinion permitting said pinion to run idle.

10. Compound gearing for a fishing reel comprising an external-internal gear, an external gear, a pinion concentrically secured to said external gear, said pinion being mounted in cooperative relation to the internal teeth of said external-internal gear, a driven pinion, and independent adjusting means for each of said gears, whereby selective or simultaneous engagement of said external gear or external teeth of said external-internal gear with said driven pinion is effected, the internal teeth of said external-internal gear engaging with and disengaging from said pinion as the external gear and external teeth of said external-internal gear are selectively brought into engagement with said driven pinion.

11. Compound gearing for a fishing reel comprising; a reel cap, an eccentric and an adjusting lever secured thereto, said eccentric being rotatably mounted in said reel cap, a shaft rotatably mounted in said eccentric, a crank secured to one end of said shaft, an external-internal gear secured to the other end of said shaft, a bracket mounted for oscillatory movement, a second eccentric and an adjusting lever secured thereto, and being rotatably mounted in said reel cap, said second eccentric cooperating with said bracket to effect oscillatory movement of said bracket, an intermediate pinion concentrically secured to said external gear, said intermediate pinion being in cooperative relation to the internal teeth of said external-internal gear, and a driven pinion mounted in cooperative relation to said external gear and external teeth of said external-internal gear, whereby the meshing and unmeshing of said external gear and external teeth of said external-internal gear with said driven pinion and of the internal teeth of said external-internal gear with said intermediate pinion is effected by the selective or simultaneous adjustment of said eccentrics.

12. In combination with a fishing reel; compound gearing comprising a driven pinion, two gears of different diameters mounted in cooperative relation to said pinion and driving means for said gears, adjustable means for each gear for independently adjusting each gear into and out of engagement with said driven pinion, said adjusting means permitting selective or simultaneous engagement of said gears with said pinion, selective engagement of said gears providing different ratios between said driving means and said driven pinion, simultaneous engagement of said gears causing a drag on said driven pinion, and disengagement of both gears permitting said driven pinion to run free, whereby a drag on the reel and a free running reel are selectively provided by said different ratios.

HARRY J. MATHIEU.